(12) United States Patent
O'Neil

(10) Patent No.: US 8,991,025 B2
(45) Date of Patent: Mar. 31, 2015

(54) MACHINE AND METHOD FOR BEDDING BRAKE PADS AND DISCS

(71) Applicant: Essex Parts Services Inc., Cramerton, NC (US)

(72) Inventor: Michael Terrence O'Neil, Gastonia, NC (US)

(73) Assignee: Essex Parts Services, Inc., Cramerton, NC (US)

( * ) Notice: Subject to any disclaimer, the term of this patent is extended or adjusted under 35 U.S.C. 154(b) by 246 days.

(21) Appl. No.: 13/790,175

(22) Filed: Mar. 8, 2013

(65) Prior Publication Data

US 2014/0165350 A1  Jun. 19, 2014

Related U.S. Application Data

(60) Provisional application No. 61/738,559, filed on Dec. 18, 2012.

(51) Int. Cl.
 *B24B 39/00* (2006.01)

(52) U.S. Cl.
 CPC . *B24B 39/00* (2013.01); *Y10T 29/47* (2015.01)
 USPC ............. 29/407.01; 29/407.08; 29/90.01; 264/446; 264/40.1; 264/234

(58) Field of Classification Search
 CPC ...... B24B 39/00; B24B 53/00; B24B 53/003; B24B 53/005; B24B 53/02; B24B 49/00; B24B 49/006; B24B 49/14; B24B 49/16; B24B 19/28; Y10T 29/47; C21D 7/08; F16D 65/092; F16D 2250/0038; F16D 69/00
 USPC ........ 29/407.01, 407.05, 407.08, 90.01, 90.1; 264/446, 40.1, 234
 See application file for complete search history.

(56) References Cited

U.S. PATENT DOCUMENTS

| | | | |
|---|---|---|---|
| 2,304,530 A | 12/1942 | Bigelow | |
| 5,231,861 A | 8/1993 | Tokumura et al. | |
| 5,535,859 A * | 7/1996 | Zeng | 188/250 B |
| 5,561,895 A | 10/1996 | Clark | |
| 5,693,402 A | 12/1997 | Chwastiak et al. | |
| 5,730,257 A | 3/1998 | Clark | |
| 5,871,685 A | 2/1999 | Chwastiak et al. | |

* cited by examiner

*Primary Examiner* — David Bryant
*Assistant Examiner* — Jun Yoo
(74) *Attorney, Agent, or Firm* — Jeffrey Watson; Balser & Grell IP Law

(57) ABSTRACT

A method for bedding a brake disc and/or pad includes monitoring the temperature of the brake disc and/or brake pad throughout the bedding process wherein the monitored temperature is utilized for adjusting the force of the brake pad on the brake disc including the steps of: raising the temperature of the brake pads and/or discs at a controlled rate to a desired bedding temperature; and maintaining the brake pads and/or discs at the bedding temperature. A machine for bedding a brake disc and/or pad is adapted to conduct the method by including at least one temperature sensor monitoring the temperature of a brake disc and/or brake pad throughout the bedding process. The machine regulates the speed of the motor, the pressure of the caliper, or a combination thereof, based on the temperature monitored by the temperature sensors.

7 Claims, 10 Drawing Sheets

MACHINE AND METHOD FOR BEDDING BRAKE PADS AND DISCS

RELATED APPLICATION

This application claims the benefit of provisional application Ser. No. 61/738,559 filed Dec. 18, 2012.

FIELD OF THE INVENTION

The present invention relates generally to brake pads and discs, and more particularly to a machine and method for bedding brake pads and/or discs.

BACKGROUND OF THE INVENTION

The disc brake is a brake for a wheel which slows down the rotation of the wheel by friction caused by pushing brake pads against a brake disc usually with hydraulic force. The brake disc rotates in unison with the wheel and/or the axle. To stop the wheel, friction material in the form of brake pads, mounted on a device called a brake caliper, is forced against both sides of the disc. The caliper can be forced by many different mechanisms including mechanically, hydraulically, pneumatically and/or electromagnetically. Friction causes the disc and attached wheel to slow or stop.

The brake disc, also known as the rotor, is the disc component that is attached to or rotates with the wheel against which the brake pads are applied. The disc is usually made of cast iron, but may also be made of steel, composites such as reinforced carbon-carbon, ceramic matrix composites, or other materials. Brake discs are all substantially disc shaped, but can vary in many aspects of their design. For example, some discs are simply solid through their thickness. Ventilated discs have vanes or voids between the opposing friction faces to improve cooling, which can be particularly important for heavy, high-speed, or high-power applications where much heat needs to be dissipated. As another example, some brake discs have holes drilled through the friction faces, known as cross-drilled discs. As yet another example, discs may also be slotted, where shallow channels are machined into the disc to aid in removing dust and gas. Slotted disc designs may be the preferred method in most racing environments to remove gas and water and to deglaze brake pads. Slotted discs may be beneficial to race vehicles because they keep the pads effective and avoid vitrification and other detrimental transformations of their surfaces. Discs are typically mounted on the wheel via studs. However, high performance discs may be mounted to a hat or mounting bell in a way that allows it to expand in a controlled symmetrical way with less unwanted heat transfer to the hub, thereby reducing and/or eliminating thermal stress, cracking and warping.

Brake pads are designed to transmit high friction forces while wearing evenly. Depending on the properties of the material of both the pad and the disc and the configuration and the usage, pad and disc wear rates will vary considerably. The properties that determine material wear involve trade-offs between performance and longevity. The brake pads must usually be replaced regularly (depending on pad material), and some are equipped with a mechanism that alerts drivers that replacement is needed. Generally, road-going vehicles have two brake pads per caliper, while up to six are installed on each racing caliper, sometimes with varying frictional properties in a staggered pattern for optimum performance.

Bedding, also known as burnishing, is a process using heat and/or friction to alter the surface of a brake pad and/or a brake disc. Bedding of brake pads and/or discs may be desired to improve the performance of a brake system. The formation of a transfer layer of brake pad friction material on the brake disc can raise the friction coefficient and/or make the friction level more consistent under a variety of speeds, pressures, and temperatures. The heat and mechanical working of the brake disc surface can also relieve stress within the brake disc reducing the likelihood of cracking of the brake disc when in use. As such, bedding or burnishing of the brake pads and discs is an important part of the preparation for brake pads and discs, particularly for those that will be exposed to severe conditions, like in the racing industry.

When bedding the brake pads and discs, the amount of transfer layer developed and stress relieved are both highly pressure and temperature dependent. Thus, bedding of the brake pads and discs requires a controlled process. Burnishing can be performed on the vehicle, however, there is seldom a way to measure and precisely control component temperature while driving. Lack of control can yield inconsistent results.

As a result, burnishing of brake discs and pads before installation on a vehicle is known to be performed on machines. The amount of control used with these machines with respect to temperature has been limited. Often an inertia wheel has been used by spinning it up to a specified speed, applying a braking force, and removing the brake pressure once the second specified speed is achieved or after a specified time interval. Alternatively, a driving device of some other form turns the brake disc and applies braking torque according to specified time intervals or durations. The problem with these techniques is that they cannot accurately control a desired peak temperature. In addition, these techniques can not hold the brake pad or brake disc surface within a small predetermined temperature range for long time periods.

The instant invention is designed to address the above mentioned problems by providing a machine and method for more accurately and consistently bedding brake discs and/or pads.

SUMMARY OF THE INVENTION

The instant invention is directed towards a machine and/or method for bedding brake pads and/or discs. The method includes monitoring the temperature of the brake disc and/or brake pad throughout the bedding process wherein the monitored temperature is utilized for adjusting the force of the brake pad on the brake disc including the steps of: raising the temperature of the brake pads and/or discs at a controlled rate to a desired bedding temperature; and maintaining the brake pads and/or discs at the bedding temperature. The machine is adapted to conduct the method by including at least one temperature sensor monitoring the temperature of a brake disc and/or brake pad throughout the bedding process. The machine regulates the speed of the motor, the pressure of the caliper, or a combination thereof, based on the temperature monitored by the temperature sensors.

BRIEF DESCRIPTION OF THE DRAWINGS

For the purpose of illustrating the invention, there is shown in the drawings a form that is presently preferred; it being understood, however, that this invention is not limited to the precise arrangements and instrumentalities shown.

DETAILED DESCRIPTION OF THE INVENTION

Figure 1:
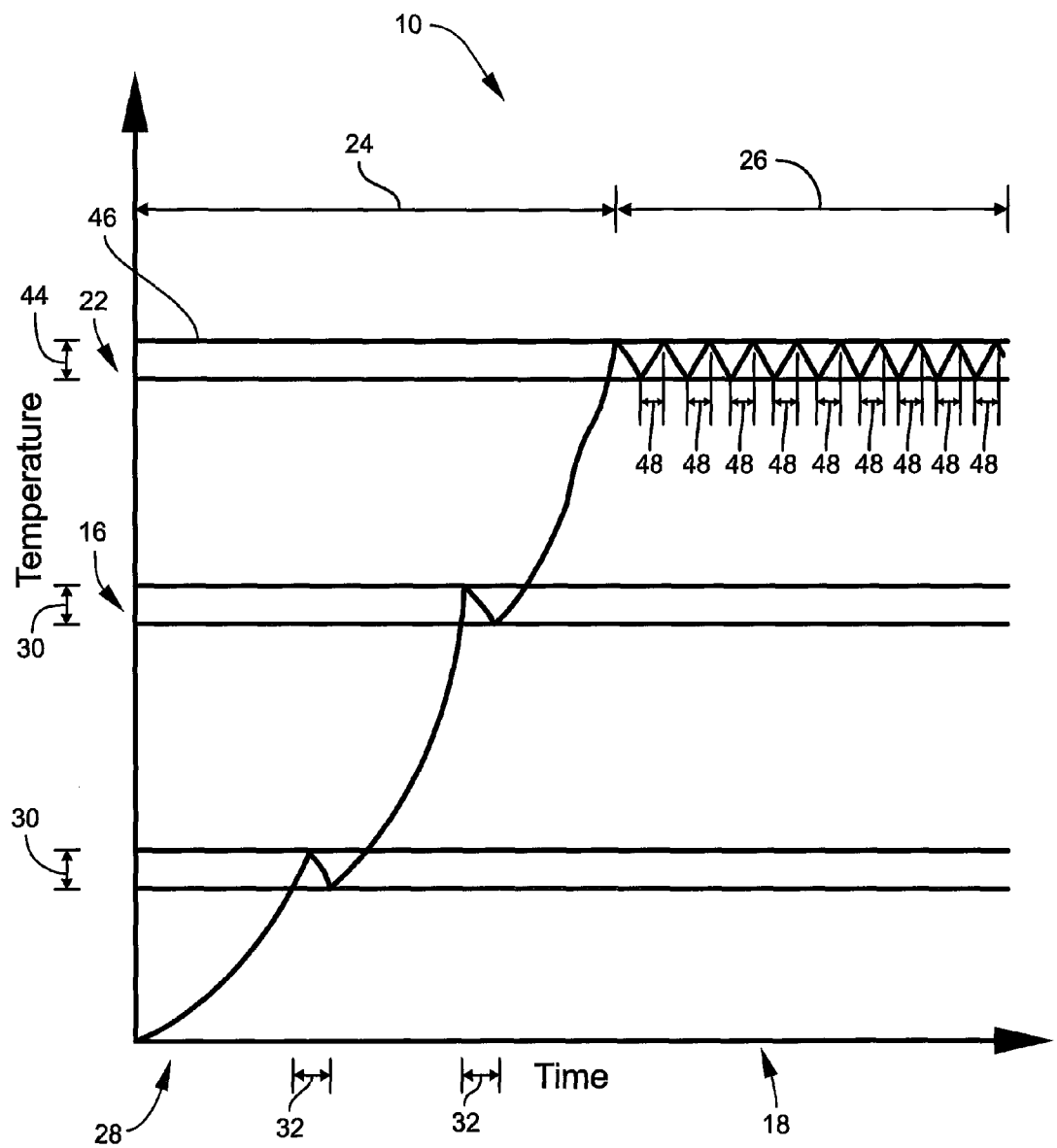
FIG. 1 is a line graph of temperature vs. time showing the method of bedding brake discs and/or pads according to one embodiment of the instant invention.
Figure 2:
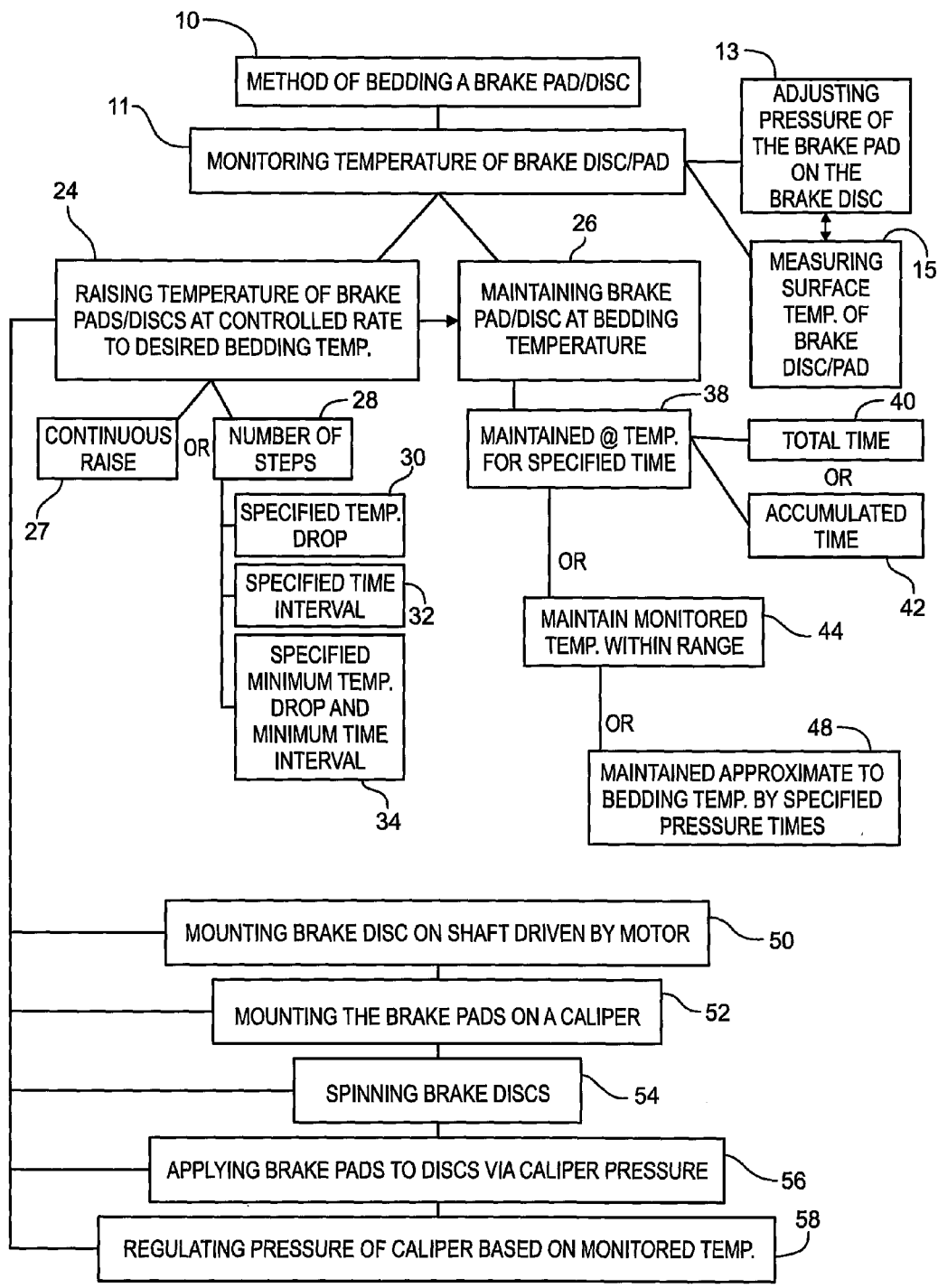
FIG. 2 is a flow chart of the method of bedding brake discs and/or pads according to one embodiment of the instant invention.

Referring to the drawings, wherein like numerals indicate like elements, there is shown in FIGS. 1-2 an embodiment of a method 10 of bedding brake pads and/or discs. The instant invention is directed toward method 10 for bedding brake pads and disks, and a machine 100 (see FIGS. 3-10) utilizing method 10. Method 10 may be for bedding brake pads/discs prior to being installed on a vehicle, like a car, racecar, motorcycle, truck, other vehicle types, or even machinery. For example, the instant method 10 may be especially useful in the racing industry for bedding brake pads/discs prior to competition. However, the invention is not so limited, and method 10 may be utilized for bedding or burnishing any brake pads and/or discs. The instant method 10 of bedding brake pads and/or discs may generally include a step 11 of monitoring the temperature 16 of the brake disc and/or brake pad throughout the bedding process. The monitored temperature 16 may be utilized for a step 13 of adjusting and/or turning on or off the force of the brake pad on the brake disc. In another embodiment, the monitored temperature 16 may be utilized for adjusting the speed of the brake disc. In yet another embodiment, the monitored temperature 16 may be utilized to adjust the force of the brake pad on the brake disc and the speed of the brake disc. With method 10, the monitored temperature 16 may be utilized for raising the temperature of the brake pads and/or discs at a controlled rate. The monitoring step 11 of the temperature 16 of the brake disc and/or brake pad may include any temperature measurement, including, but not limited to, a step 15 of measuring the surface temperature of the brake disc.

Method 10 of bedding a brake disc and/or pad is designed to be a closed-loop system using temperature as the primary controlling parameter. Temperature of the disc or pad is measured and that information is automatically sent back to the controlling unit. The force of the brake pads on the brake disk, i.e. the pressure, can be adjusted or turned on or off to keep the temperature within a tight range. It can also be used to raise or lower the temperature at a controlled rate. The advantage of this method is that it creates a more consistent finished product. It also automatically compensates for discs and pads of different friction area, mass, and other variables greatly minimizing the need to reprogram or make other adjustments for different brake pad and disc geometries and materials.

The instant invention is designed as a closed loop system with friction force that may be created between the disc and the friction material being the heat source that is controlled. The friction process allows the formation of a transfer layer on the brake disc friction surface and physically works the surface of the disc to aid in stress relieving. The closed loop system is designed to utilize measured parameters for the rate at which the temperature is brought up and tracking the time at which the temperature is in the target range. The instant invention also has the ability to measure temperature variation across the disc friction face. The machine will release hydraulic pressure and allow the disc to cool (temperature evens out in the process) while the disc is still turning for a specified adjustable time period or until the measured temperature variation drops to a certain value. Then the process will continue again.

In one embodiment of method 10 of bedding brake discs/pads, the instant invention may be designed so that if the temperature 16 varies across the face of the disc by more than a specified amount, the machine either stops the bedding/processing (no hydraulic pressure to caliper) or it may pause for a specified time before reapplying the hydraulic pressure. This embodiment has the ability to prevent damage to the brake disc by ensuring that the temperature variation across the friction face of the disc and the pad stays within specified limits throughout the process.

As shown in FIGS. 1-2, in one embodiment of the instant invention, the method 10 of bedding a brake pad and/or a brake disc may include the following steps. A step 24 may be included of raising the temperature 16 of the brake pads and/or discs at a controlled rate to a desired bedding temperature 22. As shown in FIG. 1, the term bedding temperature 22 and "target" temperature 22 relate to the elevated temperature area where the machine or method is trying to maintain the temperature within a specified range 44. Also included in method 10 is a step 26 of maintaining the brake pads and/or discs at the bedding temperature 22, or within a specified temperature range 44 (i.e. the "target" temperature or temperature range).

The step 24 of raising the temperature of the brake pads and/or discs at a controlled rate to a desired bedding temperature 22 may include any steps or process of raising the temperature of the brake pads and/or discs to the desired bedding temperature 22. In one embodiment, step 24 may include a step 27 of raising the temperature continuously until the specified bedding temperature is reached. In another embodiment, as shown in FIG. 1, step 24 may include a step 28 or a plurality of steps 28 of raising the temperature in a number of steps with cooling periods or other pauses between each step. The temperature raising steps 28 may be determined by any number of desired parameters, including, but not limited to, a specified temperature drop 30, a specified time interval 32, a specified minimum temperature drop and a minimum time interval 34, other desired parameters, and combinations thereof. The plurality of steps 28 of raising the temperature may reduce the risk of damaging the pads and/or disc caused from large temperature gradients.

The step 26 of maintaining the brake pads and/or discs at the bedding temperature 22 may include any steps or processes for maintaining the temperature of the brake pads and/or discs at the desired bedding temperature 22. In one embodiment, the step 26 may include maintaining the brake pads and/or discs approximate to the bedding temperature 22 for a specified time 38. In this embodiment, the brake pads and/or discs are maintained approximate to the bedding temperature 22 for a specified time 38 by maintaining the monitored temperature within a specified temperature range 44, or by specified pressure times 48 for applying force of the brake pads on the brake discs up to a specified temperature. The specified time can be calculated by any means, including, but not limited to, based on the total time 40 the machine is running at the target temperature or within the target temperature range, or it may be calculated based on the accumulated time 42 when pressure is applied by the caliper on the brake pad to the brake disc. The discs and pads may be bedded where the target range is +/−"a value". For example, if the bedding temperature is 600 degrees and the allowed variation is 15 degrees, then the method 10 or machine 100 may allow the temperature 16 to climb to 615, drop to 585, and cycle between the two values to maintain the temperature 16 within +/−15 degrees of 600. However, the invention is not so limited and the +/−value may be any other desired value along with the bedding temperature being any other desired value.

The method of the instant invention for bedding brake pads and/or discs may be carried out by any machine or process. For example, method 10 may be carried out on machine 100 shown in FIGS. 3-10. However, the invention is not so limited and other machines or processes may be used for carrying out method 10. Referring to carrying out method 10 on machine 100, in various embodiments of the instant invention, the method 10 of bedding a brake pad and/or a brake disc may include, but is not limited to, the following steps: a step 50 of mounting a brake disc on a shaft driven by a motor; a step 52 of mounting the brake pads on a caliper; a step 54 of spinning the brake disc; a step 56 of applying the brake pads to the brake discs via the caliper at a pressure; a step 58 of regulating the pressure of the caliper based on the monitored temperature; and combinations thereof. However, the invention is not so limited and other steps may be desired or required to carry out method 10 on machine 100 or other various machines utilizing method 10.

Referring to FIGS. 3-10, wherein like numerals indicate like elements, one embodiment of the instant invention of a machine 100 for bedding brake pads and/or discs is shown. However, the invention is not so limited to the embodiment shown in the Figures, and other configurations of the machine are certainly contemplated by the inventor, as one skilled in the art should readily understand. Machine 100 may generally include: a motor 108; a shaft 110 holding a brake disc 14 being driven by motor 108; a caliper 112 holding at least one brake pad 12; and at least one temperature sensor 102 monitoring the temperature 16 of brake disc 14 and/or brake pad 12 throughout the bedding process. These parts and the machine are described in greater detail below.

Motor 108 may be included in machine 100 of the instant invention for bedding brake pads and/or discs. See FIG. 3. Motor 108 may be for spinning the brake disc 14. Motor 108 may be any motor capable of spinning brake disc 14. In one embodiment, motor 108 may be an electric motor. Motor 108 may be adapted to spin shaft 110 thereby rotating brake disc 14 attached to shaft 110. The motor 108 may spin the shaft 110 by any means including, but not limited to a belt drive 144. Belt drive 144 may be a standard belt drive for communicating the forces of a motor to a shaft. Alternatively, any other device or mechanism may be used for communicating the forces of the motor 108 to the shaft 110, like gears, crank shafts, etc.

Shaft 110 may be included in machine 100 of the instant invention for bedding brake pads and/or discs. See FIGS. 3-6. Shaft 110 may be for communicating the force of motor 108 to the brake disc 14. Shaft 110 may be any device capable of communicating the force of motor 108 to the brake disc 14. Shaft 110 may be any shape or size, including, but not limited to cylindrical. Shaft 110 may be made of any material capable of withstanding the forces from motor 108 and brake disc 14 during the bedding process. In one embodiment shaft 110 may be made of a steel material. Shaft 110 may be adapted for receiving brake disc 14. Shaft 110 may include any device or shape for receiving brake disc 14. In one embodiment, shaft 110 may have external splines, grooves, or gears. The external splines, grooves or gears may be adapted for locking the rotational position of the brake disc 14 on the shaft 110.

In one embodiment, a disc adapter plate 114 may be included in machine 100 of the instant invention for bedding brake discs and/or pads. See FIGS. 4-6. Disc adapter plate 114 may be for connecting the brake disc 14 to the shaft 110. The disc adapted plate 114 may include a hole adapted to be mounted onto shaft 110. The hole of disc adapted plate 114 may have internal splines, grooves, or gears for receiving the external splines, grooves or gears of shaft 110. These internal splines, grooves or gears of disc adapter plate 114 may lock the rotation of the disc adapter plate with the rotation of shaft 110. Thus, the disc adapter plate 114 may fix the position of the brake disc 14 on shaft 110. The disc adapter plate 114 may be shaped and sized for receiving a variety of brake disc sizes and shapes to mount to shaft 110. In one embodiment, the disc adapter plate 114 may include a hub. In this embodiment, the hub mounts to the shaft 110. The shaft 110 may have splines for excellent torque transfer. A hub, like an aluminum hub, may be included on the disc adapter plate by way of bolts or other attachment means. In this embodiment, the retaining plate portion of the disc adapter plate 114 may not rotationally fix the disc 14 relative to the shaft 110. The hub/adapter assembly slides over the shaft 110. There are a few reasons for including the hub as a separate piece from the disc adapter plate, including, but not limited to: the hub may reduce the cost of the disc adapter plate 114 since the main portion will not need splines cut in them; the hub can be made out of a softer material, relative to that of shaft 110, like aluminum that may limit severely the wear on the splines of shaft 110 (the shaft 110 may be much more expensive and difficult to replace), etc. In this embodiment, the disc adapter plate 114 may be behind the disc and installed first, then the disc 14, then the disc retainer plate of the disc adapter plate 114, or other various reasons.

In one embodiment, spacer rings 116 may be included in machine 100 of the instant invention for bedding brake discs and/or pads. See FIGS. 5-6. Spacer rings 116 may be for centering brake disc 14 on shaft 110 relative to caliper 112. Spacer rings 116 may be any size or shaped device for centering brake disc 14 on shaft 110 relative to caliper 112. In one embodiment, spacer rings 116 may be circular or washer shaped objects adapted to fit on shaft 110. Spacer rings 116 may be provided on one or both sides of brake disc 14. The amount of spacer rings 116 on each side of brake disc 14 may very depending on the size and shape of brake disc 14.

Caliper 112 may be included in machine 100 of the instant invention for bedding brake pads and/or discs. See FIGS. 3 and 5-6. Caliper 112 may be for holding brake pads 12 and applying force onto brake disc 14 via brake pads 12. Caliper 112 may be any standard caliper or it may be a custom caliper designed specifically for machine 100. For example, a custom caliper 112 that allows the user to fit a wide range of pad sizes and shapes using the pad adapters and in such a manner that the pad changes can be made quickly. As one skilled in the art readily knows, it may be much quicker to change pads than it is to change calipers. Caliper 112 may be adapted to apply force on brake disc 14 via the at least one brake pad 12. Caliper 112 may be any type of caliper, including, but not limited to, a mechanical caliper, a hydraulic caliper, a pneumatic caliper and/or an electromagnetic caliper. In one embodiment, caliper 112 may be a hydraulic caliper driven by a pneumatic system. Caliper 112 may be movable between a disengaged position away from brake disc 14 (FIGS. 3 and 4) to an engaged position on brake disc 14 (FIG. 5). Caliper 112 may be moved from the disengaged position to the engaged position by any means including any manually or automated means. In one embodiment, caliper 112 may be mounted on an arm that is movable between the disengaged and engaged positions.

In one embodiment, a pad adapter plate 118 may be included in machine 100 of the instant invention for bedding brake discs and/or pads. See FIG. 7. Pad adapter plate 118 may be for connecting the brake pads 12 to the caliper 112. The pad adapter plate 118 may be shaped and sized for receiving a variety of brake pad sizes and shapes to mount to caliper 112.

In the embodiment shown in the Figures, caliper 112 may be a custom designed caliper for machine 100. There are several reasons that the instant invention includes a custom designed caliper, including, but not limited to:

Most calipers are designed or optimized for very specific purposes. They usually hold a specific pad shape, work with a specific disc diameter or thickness, or small variations thereof. Using existing calipers would have required the purchase of a large number of calipers, many of which are very expensive;

All of these calipers would have required a large amount of room to store.

Calipers can weigh well over 10 pounds and be very hot after use making handling awkward if not hazardous;

Changing a caliper just to process a disc or pad of a different shape is not a time efficient process since a caliper change involves disconnecting and reconnecting to a hydraulic system as well as a mechanical fastening system;

Different calipers have different mounting patterns, meaning that the majority, if not all, would require custom adapters. This is costly and reduces rigidity of the mounting system;

A very rigid caliper, more so than is available with most existing calipers, was desired to evenly distribute the force of the pad against the disc for more evenly distributed heat generation and the creation of an even transfer layer; and/or A pad retention system 188, which most calipers do not possess, was required to hold the pads allowing quick and easy sliding of the caliper assembly over the disc.

Figure 5:
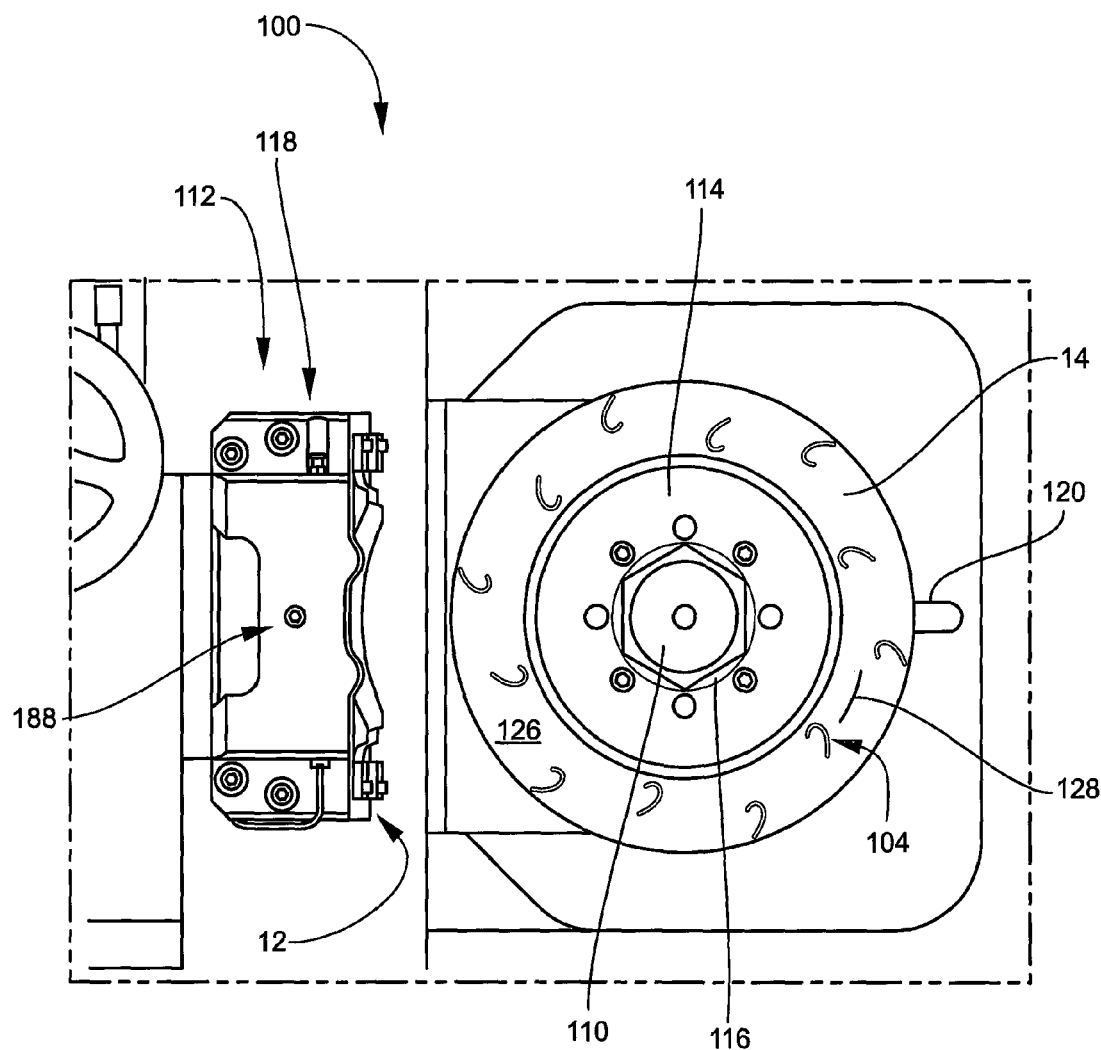
FIG. 5 is a front elevation view of the machine from FIG. 3 showing a zoomed in view of the shaft with a disc installed before the caliper is engaged with the disc.
Figure 6:
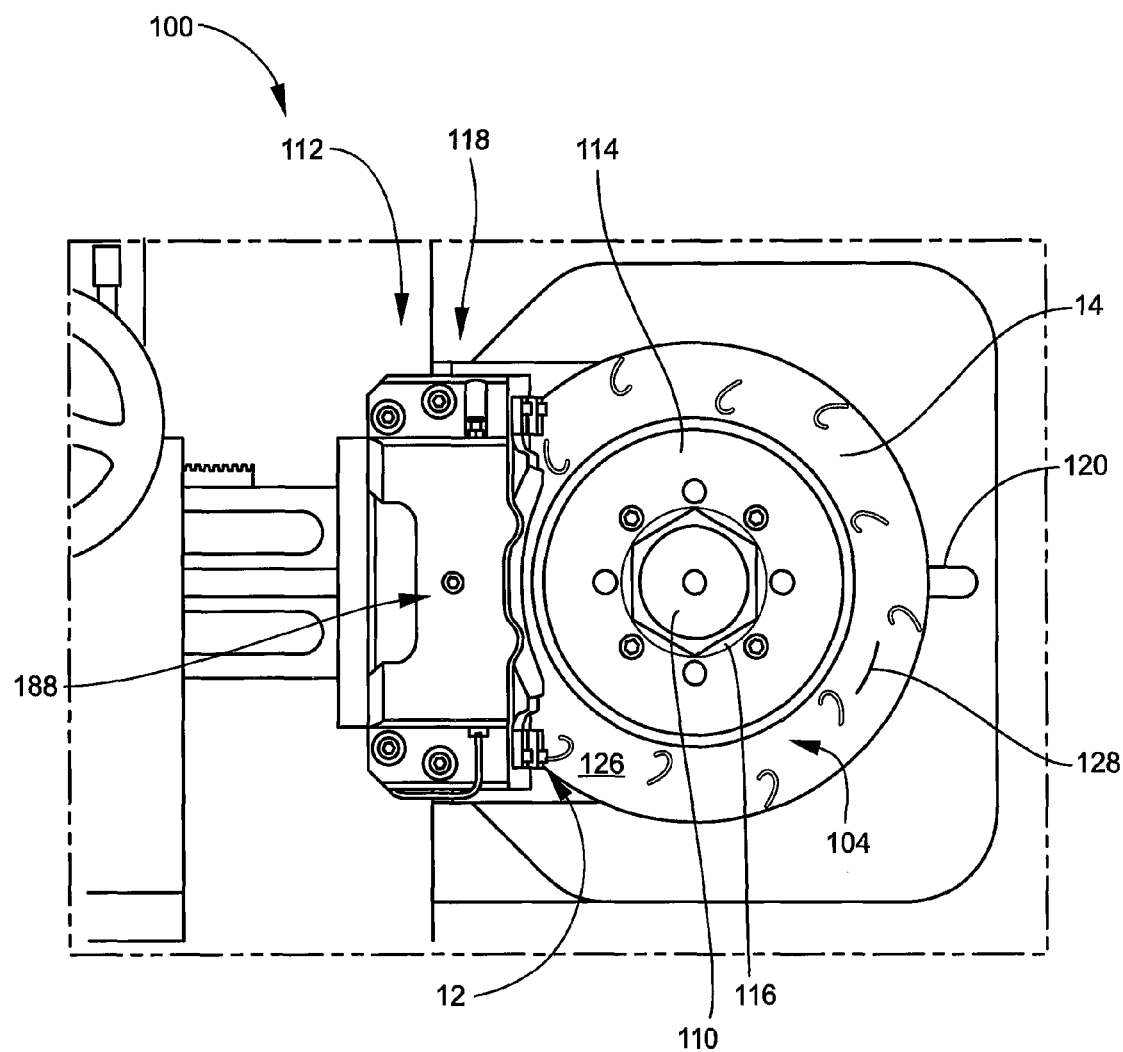
FIG. 6 is a front elevation view of the machine from FIG. 3 showing a zoomed in view of the shaft with a disc installed and the caliper engaged with the disc.

Therefore, the custom caliper 112 according to one embodiment of the instant invention may be designed to be a very rigid caliper that will work with a wide range of pad and disc configurations. The pad adapter plates 118 may allow the use of different pad shapes. Pads 12 that may be attached to adapter plates 118 are much lighter, quicker to change, and easier to handle safely than the changing and handling of a different caliper. In the embodiment shown in the Figures, spring-type retention devices may be included in pad retention system 188 that may hold the pad/adapter combinations in place when the caliper is pulled off of a disc making it quick and easy to slide the caliper 112 back over the disc 14. Piston extensions may be included for allowing for use with thin discs, thin pads, or combinations thereof. The number of pad adapter plates 118 may be limitless depending on the number of different shapes/sizes of pads 12 desired for use on machine 100. For example, the custom caliper 112 may have 12 pairs of pad adapter plates 118. In this example, the size of the pad adapter plates may be adapted so that they all fit in two drawers of a toolbox. The pad retention device/system 188 is best shown in FIGS. 5 and 6. The pad retention device/system 188 may have a shaft (shown with an internal wrenching hex) passing through the caliper body (one on each side of the caliper body) and threading into the pad retaining plate. The shaft may be in the form of a shoulder bolt. One end of a spring may push on the head of the shoulder bolt. The other end of the spring may push on the caliper body, which may push the shoulder bolt in the retraction direction pulling the adapter/pad assembly along with it.

At least one temperature sensor 102 may be included in machine 100 of the instant invention for bedding brake pads and/or discs. See FIG. 4. Temperature sensor 102 or multiple temperature sensors 102 may be for measuring the temperature of the brake pad 12 and/or disc 14 during the bedding process. Temperature sensor 102 or multiple temperature sensors 102 may be any type or sized sensor capable of measuring the temperature of the brake pads 12 and/or discs 14. In one embodiment, temperature sensors 102 may be infrared thermocouples 106. In other embodiments, a rubbing thermocouple could also be used for temperature sensors 102. However, rubbing thermocouples are much slower at reacting to temperature changes. Temperature sensors 102 may measure the temperature anywhere in or on the brake pads 12 and/or discs 14. In one embodiment, temperature sensors 102 may measure the surface temperature 104 of the brake disc 14. The machine 100 may include a single temperature sensor 102 or any desired number of temperature sensors 102 for more temperature readings. In one embodiment, machine 100 may include 2 temperature sensors 102. In this embodiment, one temperature sensor may measure the surface temperature of the inner portion of the brake disc 14 and the other temperature sensor may measure the surface temperature of the outer portion of the brake disc 14.

The temperature sensors 102 may be positioned anywhere on machine 100 for measuring the temperature of brake pad 12 and/or brake disc 14. In one embodiment, the temperature sensors 102 may be positioned in a slot 120. Slot 120 may be located on the backside of disc 14. See FIGS. 4-6 when disc 14 is mounted on shaft 110. Slot 120 may be for positioning temperature sensor 102 or multiple temperature sensors 102 relative to brake disc 14. In one embodiment, a threaded shaft 122 may be included near slot 120. The threaded shaft may be for adjusting or moving the temperature sensors 102 relative to disc 14. In this embodiment, temperature sensors 102 may be positioned on the threaded shaft 122, whereby, the rotation of the threaded shaft 122 may move the temperature sensors 102 in slot 120. In another embodiment, a laser 124 may be included in slot 120. Laser 124 may be for aiding in the positioning of temperature sensors 102 relative to disc 14. Laser 124 may be associated with the temperature sensors 102 and may be utilized for properly positioning the temperature sensors 102 by referencing a location of the brake disc friction face 126. In one embodiment, the laser may reference the center 128 of the friction area for brake disc 14 for positioning one temperature sensor 102 on the inner portion of brake disc 14 and another temperature sensor 102 on the outer portion of brake disc 14.

A hydraulic and/or pneumatic system 130 may be included in machine 100 of the instant invention for bedding brake pads and/or discs. See FIGS. 3 and 8. The hydraulic and/or pneumatic system 130 may be for providing and controlling the force applied by brake pads 12 on brake disc 14 via the pressure from caliper 112. Hydraulic and/or pneumatic system 130 may be any system for providing and controlling the pressure applied via caliper 112. Hydraulic and/or pneumatic system 130 may be associated with caliper 112 by any means for controlling the pressure of the caliper. In one embodiment, hydraulic and/or pneumatic system 130 may include: a double-piston device 132 for converting air pressure to hydraulic pressure; an incoming air pressure source 134 in communication with double-piston device 132 and an associated incoming air pressure gage 136; an incoming air pressure knob 138 for adjusting the amount of hydraulic pressure thereby adjusting the force applied by the caliper 112; and a secondary brake 140 with a secondary brake lever/actuator 142 for slowing down the shaft via a second caliper and brake disc mounted on the shaft.

A system controller/computer 146 may be included in machine 100 of the instant invention for bedding brake pads and/or discs. See FIGS. 9-10. System controller/computer 146 may be for controlling the bedding process. System controller/computer 146 may be any computer, controller, or other like device capable of controlling the bedding process in machine 100. System controller/computer 146 may be adapted to automate the bedding process in machine 100 by any means, including, but not limited to, controlling the speed of motor 108, the pressure of the caliper 112, or a combination thereof, based on the monitored temperature from the temperature sensors 102. System controller computer 146 may control the speed of the motor 108 and/or the pressure of the caliper 112 based on any desired bedding parameters 148. In one embodiment, the desired bedding parameters 148 may include: number of cycles to reach target temperature 150; how much temperature drop to allow between cycles 152; minimum pause time between cycles 154; target temperature 156; how long to stay close to the target temperature 157; amount of temperature variation from target temperature allowed 158; and combinations thereof.

The system controller/computer 146 may have a control screen or display 160. See FIG. 10. The control screen/display may be for showing bedding parameters 148 and outputs 162. Outputs 162 may be any readings taken in machine 100 before, during, or after the bedding process. In one embodiment, outputs 162 may include: total process time 164; cycle number 166; time spent at target temperature 168; average temperature measured by the thermocouples 170; maximum temperature variation between thermocouples 172; temperature measured by each thermocouple 174; present process step 176 including increasing temperature 178, at target temperature 180, completed 182, etc.; and combinations thereof.

In operation, the instant invention of a machine 100 and/or method 10 for bedding a brake disc and/or pad is designed to be a closed loop feedback system making many of its decisions based on the temperature of the brake disc 14 or the brake pad 12 to control the burnishing/bedding process. First the disc 14 may be mounted on shaft 110. Caliper 112 may be located on a mechanism allowing it to be moved over the disc 14 and locked into position. The caliper 112 can hold brake pads of a variety of shapes and thicknesses with the use of pad adapter plates 118. The shaft 110 may be powered by an electric motor 108 to spin the disc 14 inside the caliper 112. The temperature 16 of the disc is measured and that information is automatically sent back to the system controller/computer 146 and used for controlling the burnishing process. The caliper 112 clamping force is controlled by the hydraulic line pressure provided by hydraulic/pneumatic system 130, which is adjustable and can be turned on and off by the system controller, or computer controls 146. The friction force between the brake pads 12, or other friction material, and the brake disc 14 create heat and raise the temperature of both the brake pads/friction material 12 and brake disc 14. The temperature of the disc 14 can be raised using a variety of techniques, including, but not limited to:

1. One run with clamping pressure on continuously until the desired temperature is reached.
2. The temperature can be raised in a number of steps with cooling periods between each. These cooling periods can be controlled by:
   a. A specified temperature drop.
   b. A specified time interval.
   c. A specified minimum temperature drop and a minimum time interval.

Once a desired temperature is achieved the temperature of the brake disc (or brake pads) can be kept close to that temperature for a specified time using the following techniques:

1. A specified temperature range in which the temperature must stay is entered into the system controller computer 146. Clamping force is turned on and off (or controlled) by the computer 146 using information from the temperature sensor(s) 102 automatically to keep the temperature within this range.
2. A specified time delay after the clamping force is released and before it is reapplied to bring the brake disc 14 (or brake pad 12) up to a specified temperature is entered into the computer.

Once the process is over (no more applications of clamping force), the machine 100 may be stopped, the caliper 112 is moved off of the disc 14 via the adjustable position mechanism, and the disc 14 is removed from the shaft 110.

Figure 3:
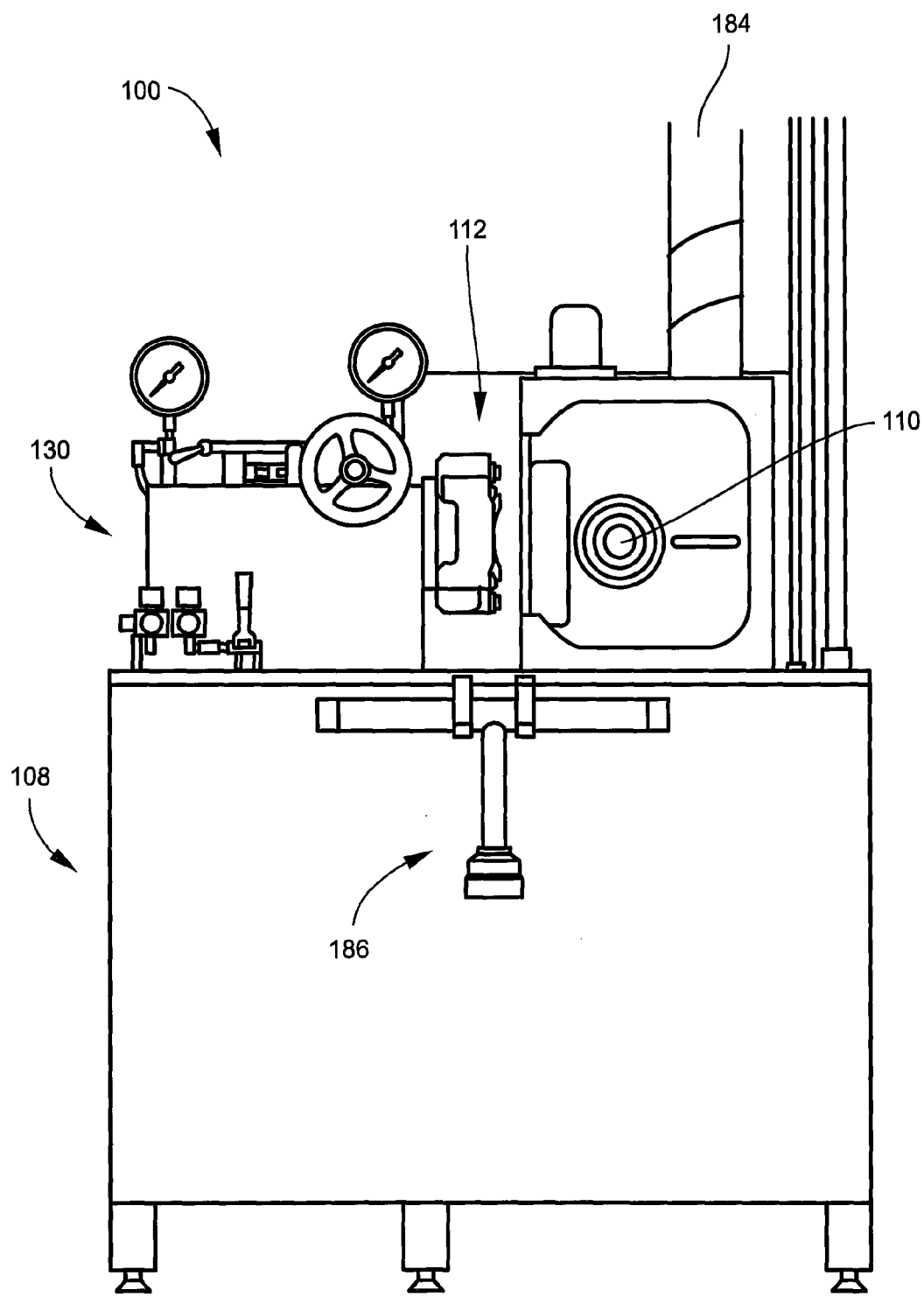
FIG. 3 is a front elevation view of the machine for bedding brake discs and/or pads according to one embodiment of the instant invention.

FIG. 3 shows a front view of one embodiment of the machine 100 for bedding brake pads and/or discs according to the instant invention. In this embodiment, the main driving motor 108 is hidden in the bottom section behind the sheet metal. The motor 108 drives the shaft 110, the working end of which is exposed below the safety light shown in the Figure. The upper left supports the hydraulics 130 and the caliper 112 that can be extended out to position the pads over the friction surface of the disc. The "T" in the middle is the wrench 186 used to tighten a disc onto the shaft. The large diameter tube 184 extending off of the upper right portion of the machine is for removing fumes and wear particles when the machine is in operation. The safety light shown in the Figure may be a blinking red light on top of the machine that lets the user know that the auxiliary brake is on, i.e. to remind the user before the motor starts after installing a disc. The safety light could be any indicator light, including like a big version of the little light you have on the dash of your car that lets you know that the parking brake is on.

Figure 4:
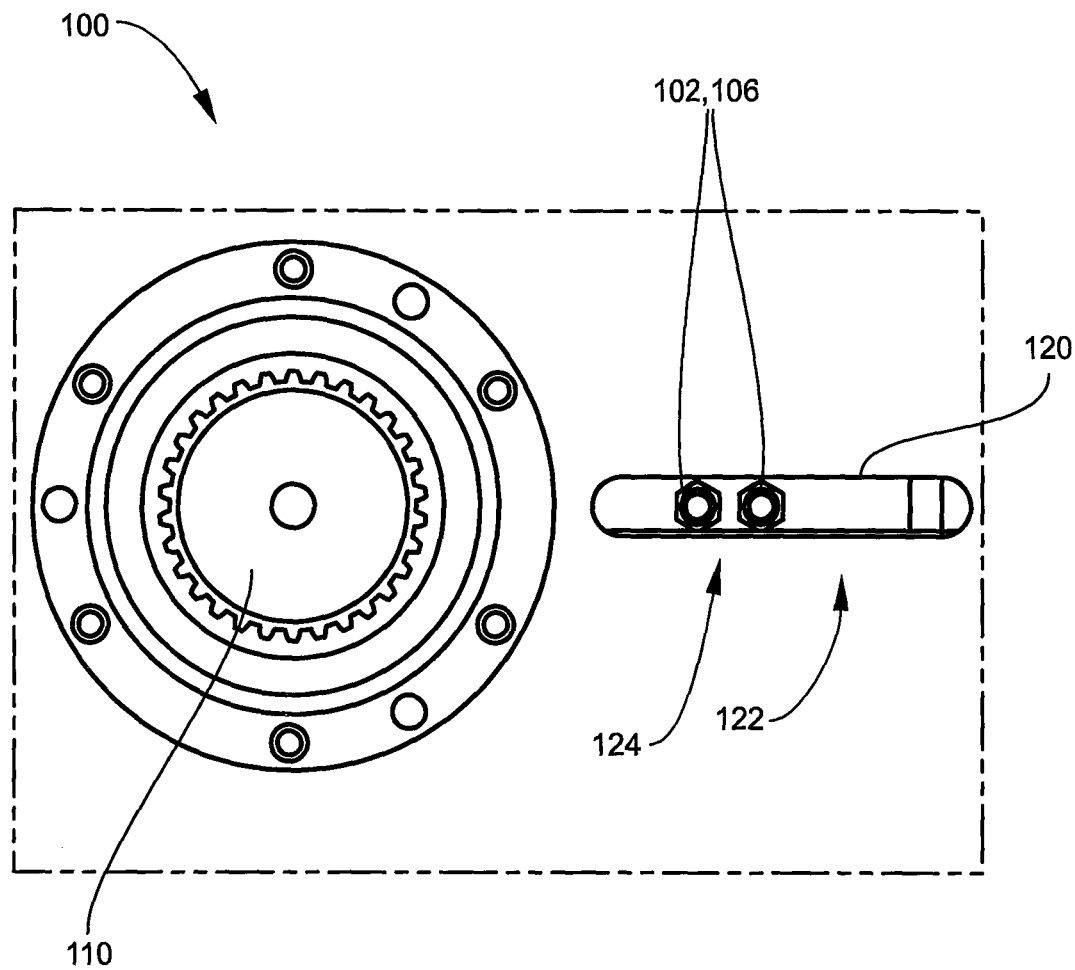
FIG. 4 is a front elevation view of the machine from FIG. 3 showing a zoomed in view of the shaft without a disc installed revealing the sensors and slot.

FIG. 4 shows a portion of the machine 100 from FIG. 3 without the brake disc 14 installed. The two temperature sensors 102 shown in the slot 120 in FIG. 4 may be infrared thermocouples 106. These temperature sensors 102 are adapted to measure the surface temperature 104 of the disc without touching it. In this embodiment, two thermocouples 106 may be used to cover inner and outer annulus sections of the disc friction face 126. The temperatures measured may be averaged to provide an average temperature for the disc friction face 126. In other embodiments, the system could be set up to run with only one or more infrared thermocouples 106. In the embodiment shown in the Figures, the thermocouples 106 are mounted on a threaded shaft 122 which allows the position of the thermocouples 106 to be quickly adjusted by the turn of a knob. The laser 124 may also be included between the two thermocouples 106 for positioning the thermocouples. For example, the thermocouples 106 may be properly positioned when the laser 124 points to a location on the disc friction face 126, including, but not limited to, the center 128 of the disc friction face 126.

FIG. 5 shows the brake disc 14 positioned on the machine 100 before the caliper arm 112 is extended out. As shown in FIG. 5, discs 14 may be mounted on the machine by disc adapter plates 114. Spacer rings 116 may be used on the shaft 110 to center brake discs 14 of different thicknesses relative to the caliper 112. In the Figure, the brake disc 14 has been installed on shaft 110 via disc adapter plates 114. The caliper 112 is shown in the retracted position. The slot 120 behind the right side of the disc 14 is where the two temperature sensors 102 are positioned. The pad adapter plates 118 and pads 12 can be seen protruding from the right side of the caliper 112. The spacer ring 116 is not visible in this view since they are behind the disc adapter plate.

FIG. 6 shows the brake disc 14 positioned on the machine with the caliper arm 112 extended out. The caliper 112 is positioned where the brake pads 12 are over the brake disc 14 friction area 126. The pad adapter plates 118 and pads can be seen protruding from the right side of the caliper 112. The spacer ring(s) 116 is(are) not visible in this view since they are behind the disc adapter plate 114. The caliper arm 112 may be extended out manually (as shown), or this process may be automated. Hydraulic pressure when applied to the caliper 112 presses the brake pads 12 on both sides of the friction disc 14 against its two friction faces 126 as the disc 14 is spinning. The friction force generates heat and transfers some friction material from the brake pads (or other friction material source) onto the disc 14. This transfer layer of friction material on the disc 14, along with the stress relieving effects produced by the heat and the mechanical drag force on the disc produce a brake disc 14 that can be more durable in operation and can have more favorable friction characteristics, such as a higher or more consistent friction coefficient.

Figure 7:
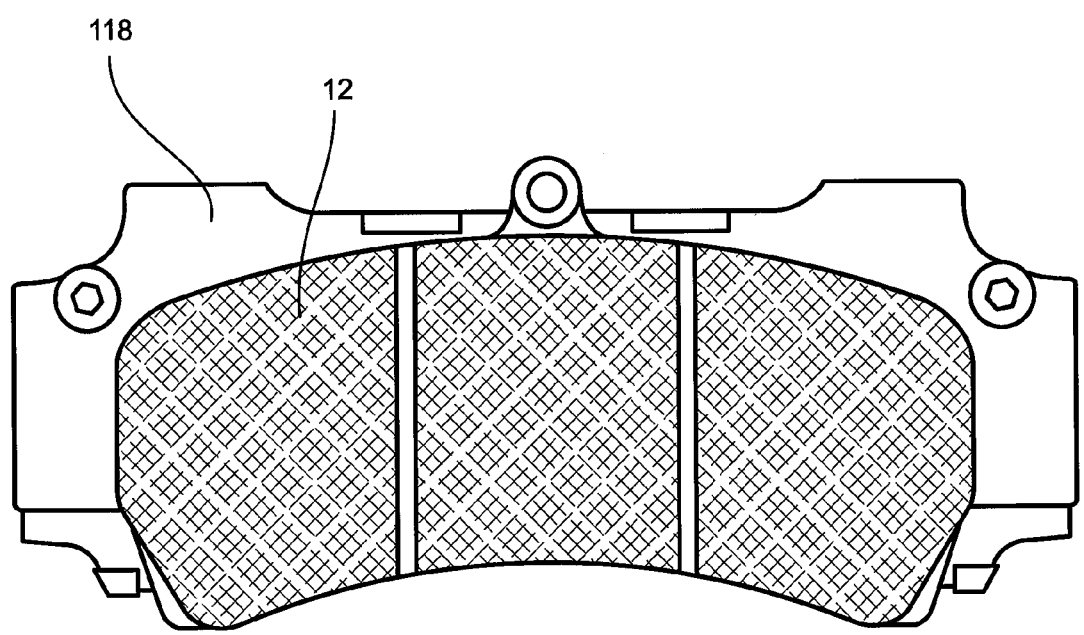
FIG. 7 is a top plan view of one embodiment of the pad adapter plate with a brake pad according to one embodiment of the instant invention.

FIG. 7 shows a brake pad 12 mounted to a pad adapter plate 118. The pad adapter plate 118 may allow one caliper 112 to be used for a wide variety of pad shapes. This pad adapter plate 112 feature of the machine of the instant invention may be adapted for quickening changeovers to different configurations. In addition, the pad adapter plate is also a less expensive option than having a different caliper 112 for each pad shape.

Figure 8:
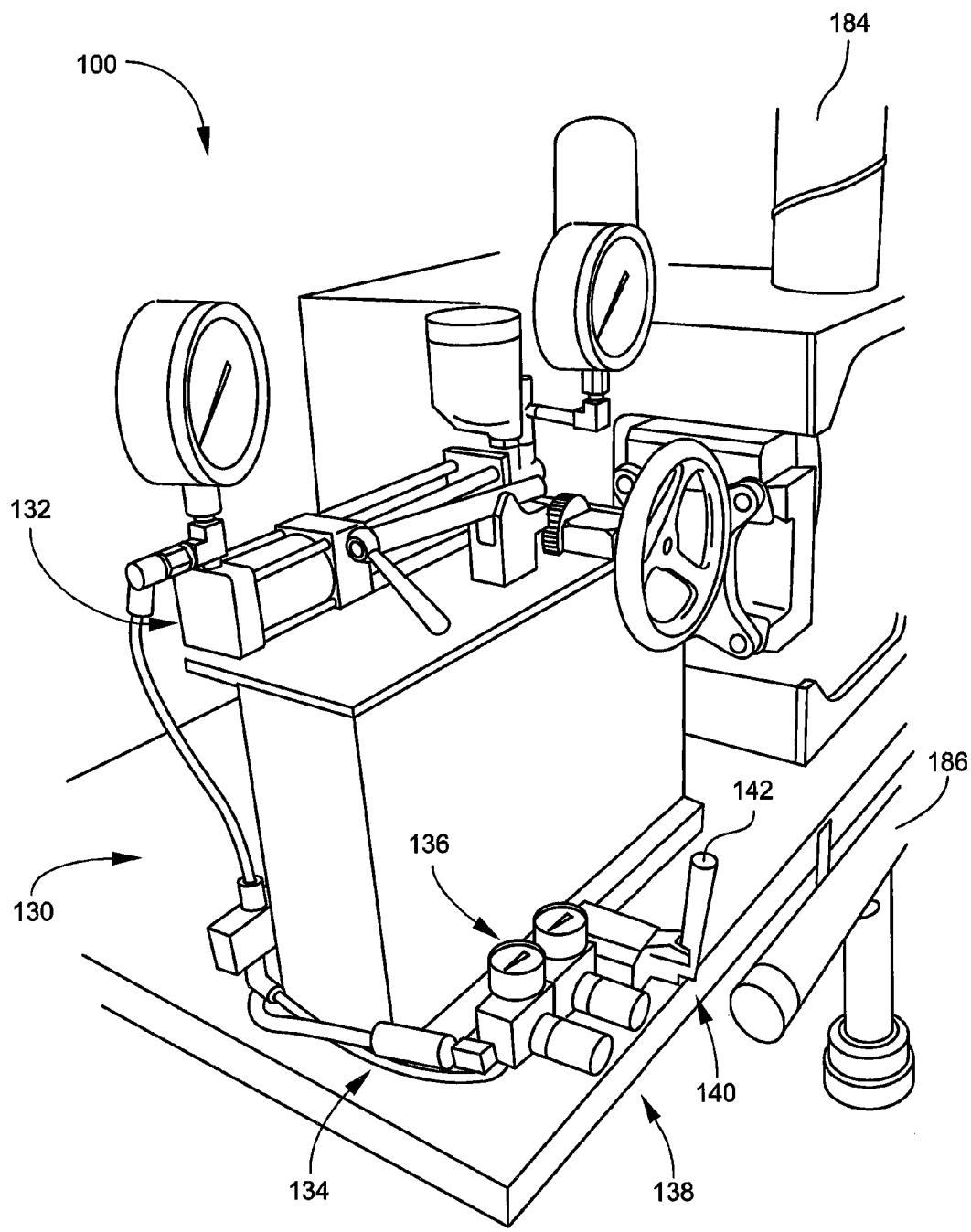
FIG. 8 is a perspective view of the machine from FIG. 3.

FIG. 8 shows another view of the embodiment of the machine 100 for bedding brake pads 12 and/or discs 14 from FIG. 3. The vertical rectangular box in the foreground serves a couple of purposes. First it supports the caliper extension arm 112 and its position locking mechanism. Second, it also supports the pneumatic/hydraulic system 130 where air pressure is converted to hydraulic pressure through double-piston device 132. The double-piston device 132 is adapted for allowing the caliper clamping force to be adjustable by adjusting the incoming air pressure (one of the two adjustment knobs). The gages 136 shown in the Figure are adapted for displaying regulated air pressure. The small black lever/actuator 142 in the lower right operates a secondary brake on the main shaft 110 that may be adapted to bring the machine to a stop at the end of a bedding (burnishing) cycle. The secondary brake may have a second caliper and brake disc mounted on the shaft. In the embodiment shown in the Figures, there are four pressure gages on the machine. The two small ones are labeled 136. The left gage of 136 indicates the regulated air pressure for the caliper and is controlled by the left knob. This regulator is before the air pressure line open/close solenoid. The right 136 gage may be for regulating air pressure for the auxiliary caliper that brings the machine to a stop. It is controlled by the right knob and is in the line before the manual open/close valve 142. The auxiliary/secondary brake works purely on air pressure. The upper left large gage is not labeled in the Figures, which is the regulated air pressure for bedding caliper activation after the open/close solenoid. The upper right large gage is also not labeled, which is the hydraulic pressure in the bedding caliper hydraulic line.

Figure 9:
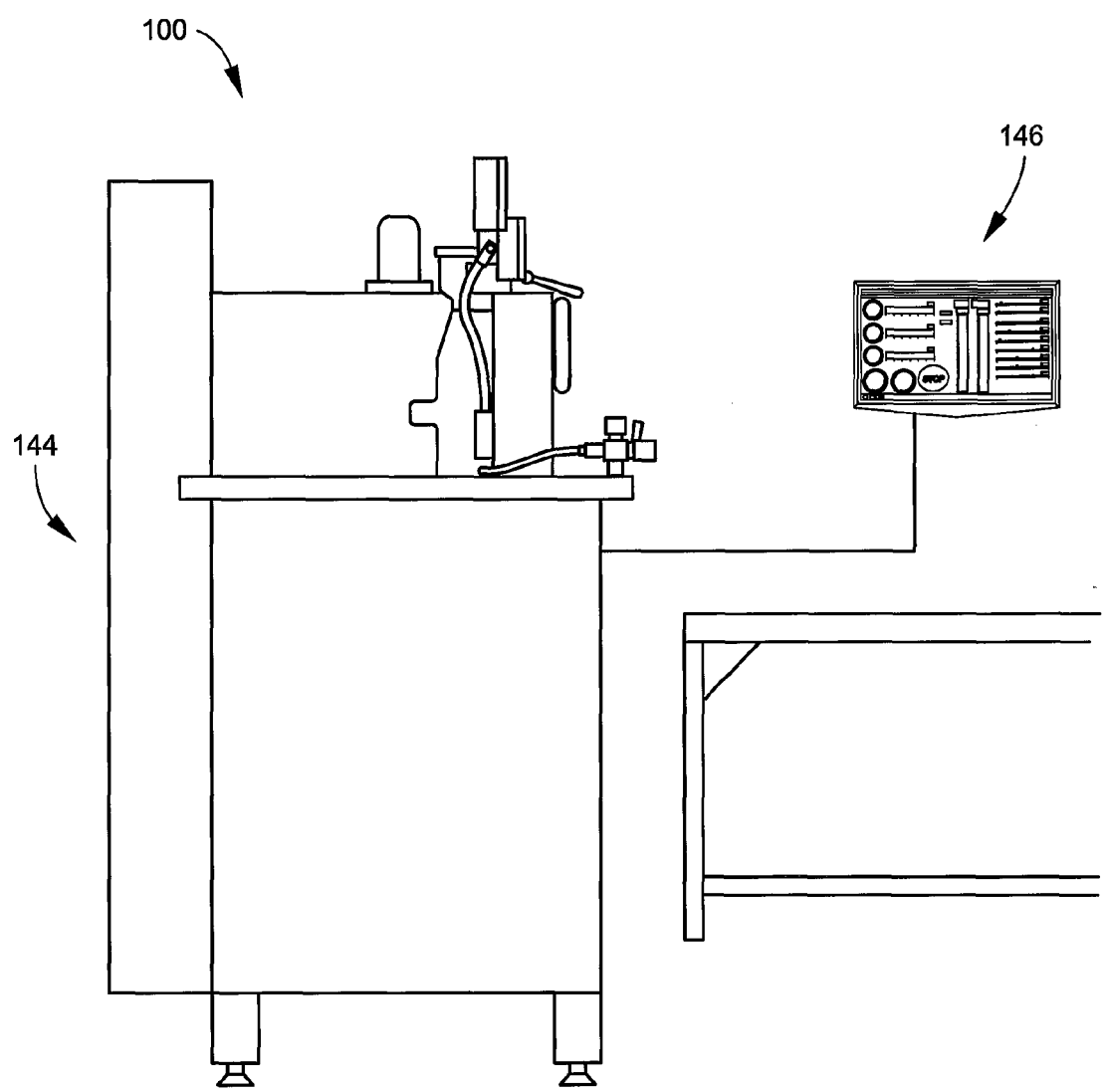
FIG. 9 is a side elevation view of the machine from FIG. 3.

FIG. 9 shows a view of the left side of the embodiment of the machine 100 from FIG. 3. The tall and slender box on the back (left in the Figure) of the machine houses the belt drive 144 coupling the motor 108 to the main shaft 110. At the workbench is the system controller, i.e. computer 146, used to control the bedding process. The computer 146 may monitor the surface temperature 104 of the brake disc 14 via the infrared thermocouples 106. It can turn the caliper 112 clamping force on or off based on temperature 16 and/or timing parameters in the computer program. The computer 146 may allow the user to control the rate at which the machine increases the disc temperature, the temperature to which it is brought up, and allows the machine to hold the disc surface at or near that temperature for a desired amount of time (see FIG. 1).

Figure 10:
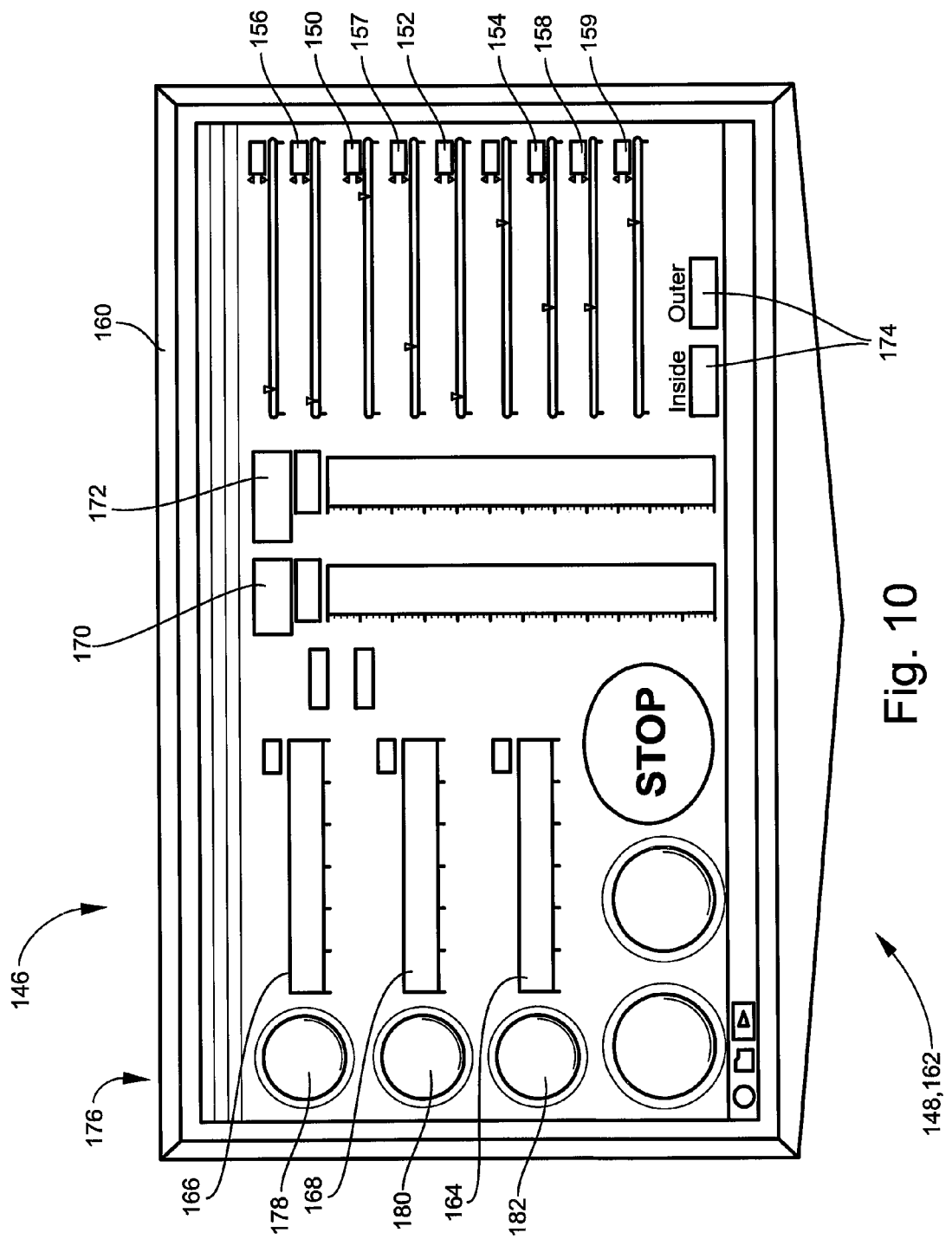
FIG. 10 is a screen shot of the computer control according to one embodiment of the instant invention.

FIG. 10 shows a screen shot of the display 160 according to one embodiment of the system controller, or computer program 146, used to control the machine 100 for bedding brake discs and/or pads of the instant invention. In this embodiment, the control screen 160 displays a combination of input controlling bedding parameters 148 and output feedback 162. As shown in FIG. 10, according to one embodiment of machine 100, the controlling parameters 148 may be:
  Number of cycles to reach target temperature (150).
  How much temperature drop to allow between cycles (152).
  Minimum pause time between cycles (154).
  Target temperature (156).
  How long to stay close to the target temperature (157).
  Amount of temperature variation from target temperature is allowed (158).
  Maximum amount of temperature variation allowed across the disc friction face before the machine interrupts the process to prevent damage to the brake disc (159).

As shown in FIG. 10, in one embodiment of Machine 100, the outputs 162 on the screen 160 may be:
  Total process time (164).
  Cycle number (166).
  Time spent in the target temperature range while the pads are under hydraulic pressure (168).
  Average temperature measured by the thermocouples (170).
  Maximum temperature variation between thermocouples (172).
  Temperature measured by each thermocouple (174).
  Present process step (176) including:
    increasing temp (178)
    In the target temperature range (180), and
    completed (182).

The present invention may be embodied in other forms without departing from the spirit and the essential attributes thereof, and, accordingly, reference should be made to the appended claims, rather than to the foregoing specification, as indicated in the scope of the invention.

I claim:
1. A method of bedding a brake pad and/or a brake disc including:
  monitoring a temperature of the brake disc and/or brake pad throughout the bedding process wherein the monitored temperature being utilized for adjusting a force of the brake pad on the brake disc including the steps of:
  raising the temperature of the brake pad and/or disc at a controlled rate to a desired bedding temperature; and
  maintaining the brake pad and/or disc at said bedding temperature.

2. The method of bedding a brake pad and/or a brake disc of claim 1 wherein the monitoring of the temperature of the brake disc and/or brake pad including measuring a surface temperature of the brake disc, wherein the monitored surface temperature being utilized for adjusting the force of the brake pad on the brake disc.

3. The method of bedding a brake pad and/or a brake disc of claim 1 wherein said step of raising the temperature of the brake pad and/or disc at a controlled rate to the desired bedding temperature including raising the temperature in a number of steps with cooling periods between steps.

4. The method of bedding a brake pad and/or a brake disc of claim 3 wherein said temperature raising steps being determined by a specified temperature drop, a specified time interval, and/or a specified minimum temperature drop and a minimum time interval.

5. The method of bedding a brake pad and/or a brake disc of claim 1 wherein said step of raising the temperature of the brake pad and/or disc at a controlled rate to a desired bedding temperature including raising the temperature continuously until the bedding temperature is reached.

6. The method of bedding a brake pad and/or a brake disc of claim 1 wherein said step of maintaining the brake pad and/or disc at said bedding temperature including maintaining the brake pad and/or disc approximate to said bedding temperature for a specified time, where time can be calculated based on a total time, or calculated based on an accumulated time when the force is applied by a caliper on the brake pad to the brake disc;

wherein, said brake pad and/or disc are maintained approximate to said bedding temperature for a specified time by maintaining the monitored temperature within a specified temperature range; or said brake pad and/or disc are maintained approximate to said bedding temperature by specified pressure times for applying the force of the brake pads on the brake discs up to a specified maximum temperature.

7. The method of bedding a brake pad and/or a brake disc of claim 1 further comprising the steps of:

mounting the brake disc on a shaft driven by a motor;

mounting the brake pads on a caliper; spinning said brake disc;

applying force from said brake pad to said brake disc via said caliper at a 5 pressure; and regulating said pressure of said caliper based on the monitored temperature.

* * * * *